(12) United States Patent
Koenig

(10) Patent No.: US 12,129,126 B2
(45) Date of Patent: Oct. 29, 2024

(54) DEVICE AND METHOD FOR DETECTING WEAR OF A TRANSPORT SYSTEM HAVING SLIDING CONTACTS

(71) Applicant: SIEMENS LOGISTICS GMBH, Nuremberg (DE)

(72) Inventor: Frank Koenig, Bochum (DE)

(73) Assignee: Siemens Logistics GmbH, Nuremberg (DE)

( * ) Notice: Subject to any disclaimer, the term of this patent is extended or adjusted under 35 U.S.C. 154(b) by 401 days.

(21) Appl. No.: 17/613,175

(22) PCT Filed: Mar. 30, 2020

(86) PCT No.: PCT/EP2020/058942
§ 371 (c)(1),
(2) Date: Nov. 22, 2021

(87) PCT Pub. No.: WO2020/239292
PCT Pub. Date: Dec. 3, 2020

(65) Prior Publication Data
US 2022/0234837 A1    Jul. 28, 2022

(30) Foreign Application Priority Data
May 24, 2019   (EP) ..................... 19176358

(51) Int. Cl.
*B60L 1/00*       (2006.01)
*B60L 3/00*       (2019.01)
(Continued)

(52) U.S. Cl.
CPC ............. *B65G 43/00* (2013.01); *G01H 17/00* (2013.01)

(58) Field of Classification Search
CPC ...... B60L 1/00; B60L 3/00; B60L 5/00; B60L 5/04; B65G 43/00; G01H 17/00
See application file for complete search history.

(56) References Cited

U.S. PATENT DOCUMENTS

2015/0239349 A1   8/2015  Keil
2018/0126384 A1*  5/2018  Robles Opazo ........ B02C 25/00
(Continued)

FOREIGN PATENT DOCUMENTS

CN     201429413 Y    3/2010
CN     108918173 A    11/2018
(Continued)

*Primary Examiner* — Nguyen Q. Ha
(74) *Attorney, Agent, or Firm* — Laurence A. Greenberg; Werner H. Stemer; Ralph E. Locher

(57) ABSTRACT

If a failure of components of a transport-system sliding contact can be predicted, preventive maintenance that is sometimes unnecessary is eliminated and an alternative run-to-failure approach associated with downtime can be avoided. A system and a method detect wear of a transport system, which system has a sliding contact with a current collector mounted on a vehicle and a current-carrying conductor. The vehicle travels along the current-carrying conductor, the current collector being pressed against the current-carrying conductor. Vibrations produced during the driving motion are registered by a vibration sensor attached to the current collector and wirelessly transmitted to a background system. The background system is configured to subject the transmitted data, in particular the registered vibrations, to an analysis and to signal wear of the transport system, in particular wear of the current collector and/or of the current-carrying conductor, on the basis of the analysis.

20 Claims, 2 Drawing Sheets

(51) Int. Cl.
    *B60L 5/00*           (2006.01)
    *B65G 43/00*        (2006.01)
    *G01H 17/00*        (2006.01)

(56) References Cited

U.S. PATENT DOCUMENTS

2018/0215401 A1\*   8/2018   Boichot ................... B60L 5/42
2020/0010100 A1\*   1/2020   Roepke ................... B60L 5/10

FOREIGN PATENT DOCUMENTS

| | | |
|---|---|---|
| DE | 102017214418 A1 | 2/2019 |
| EP | 2325656 A1 | 5/2011 |
| JP | H03261303 A | 11/1991 |
| JP | 2003189404 A | 7/2003 |
| JP | 2016192863 A | 11/2016 |

\* cited by examiner

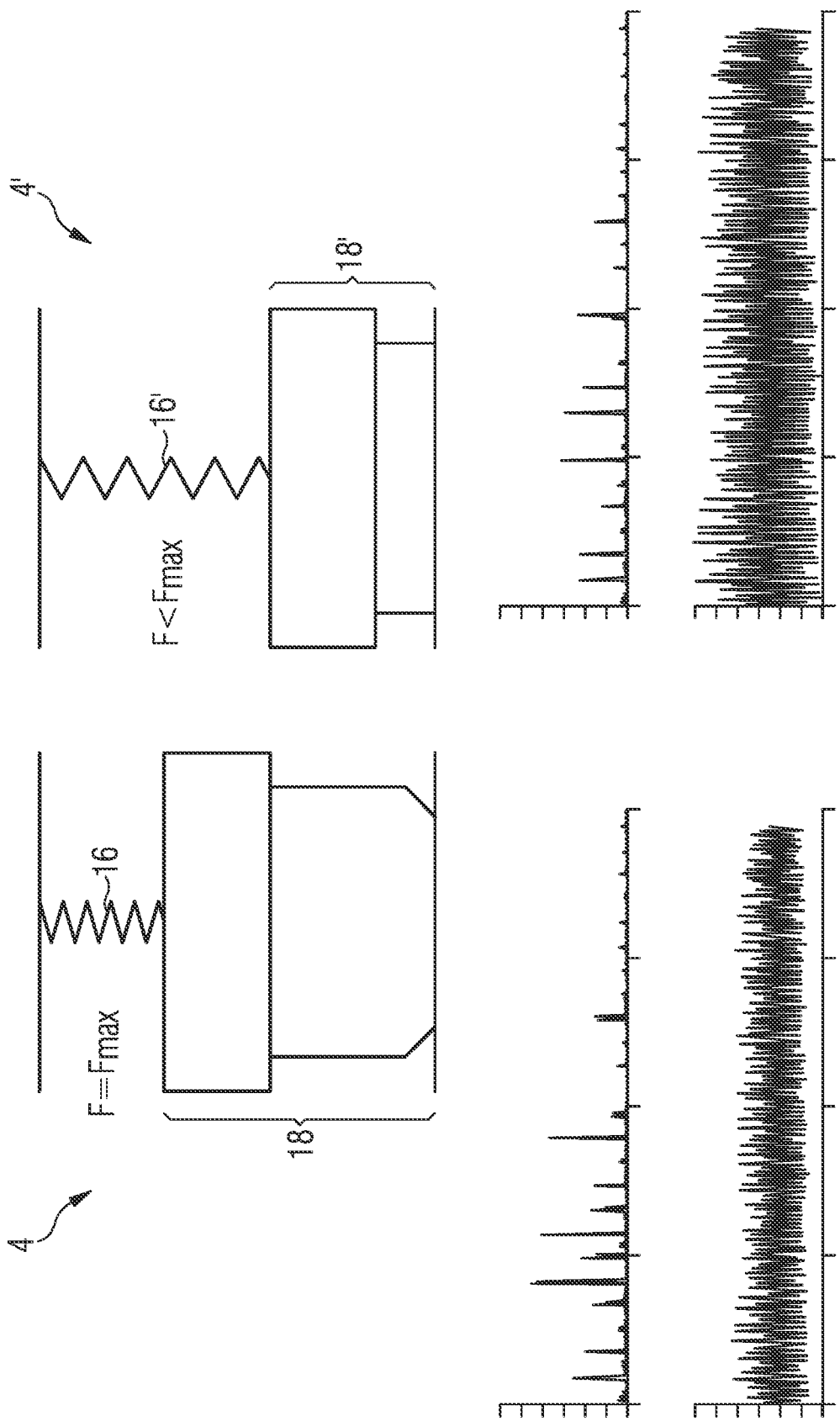

DEVICE AND METHOD FOR DETECTING WEAR OF A TRANSPORT SYSTEM HAVING SLIDING CONTACTS

FIELD AND BACKGROUND OF THE INVENTION

The present invention relates to conveying systems which have a sliding contact, in particular airport baggage conveying systems.

Conveying systems with sliding contacts have wear parts (power supply rails, current collectors with carbon brushes, etc.) with a limited service life which is dependent on various factors such as, for example, the period of use, load intensity, humidity, deposits, foreign bodies, and corrosion.

The current collector of the sliding contact is in constant sliding contact with the busbar of the sliding contact while its vehicle is in motion. Both the current collector, in particular its carbon brush, and the busbar wear out as a result of friction. The current collector and the busbar must therefore be replaced regularly. As a change of busbars is associated with considerable effort, a softer material is usually selected for the carbon brush so that the wear on the current collector is higher and the busbar is protected.

Busbar current collector conveying systems are used in airport baggage conveying systems to drive the new generation of baggage sorters or early baggage storage (EBS) shuttles.

It is the goal of every airport to reduce failures of baggage handling systems as much as possible. Baggage handling systems often include sliding contacts comprising busbars and current collectors. Thus, during operation, the system is kept 'alive' and during non-operating hours time-based maintenance is carried out. SCADA (Supervisory Control and Data Acquisition) systems are frequently used in airports for status monitoring of baggage handling systems. SCADA enables the operating status of the entire conveying system to be monitored. SCADA can initiate action if parts of the conveying system are not available for the baggage handling process. Minor malfunctions such as baggage blockages or traffic jams can be remedied within minutes and enable the affected section to be returned to normal operation. However, failures caused by wear of components such as sliding contacts cannot always be remedied without affecting the availability and capacity of the entire system. These failures can become significant problems associated with high costs for the airport and system operators. It is therefore essential to predict, resolve and avoid failures of components.

Busbars and current collectors are in constant use as wear parts, a sorter typically runs 7 days a week for 18 hours a day. The remaining useful life can be estimated by counting the operating hours. However, this estimate does not necessarily reflect the actual condition of the wear parts. On the one hand, the condition of the busbar influences the condition of the carbon brush and vice versa. Other causes of failures with a negative impact on service life are incorrectly oriented connections, preaging, foreign bodies, etc.

The environmental and thus operating conditions of the conveying system have an impact on both the performance and service life of the carbon brush. Moisture has a great impact on the coefficient of friction of the carbon brush, one of the main parameters for its performance. Under ideal conditions, a mixture of graphite, metal oxides and humidity forms a film on the surface of the busbar, thereby reducing the coefficient of friction and thus the wear. If the air is too dry for the development of such a film, special brush treatments are recommended. Hot atmospheres and supersaturated humidity have a negative impact on brush performance. The brushes tend to form too much film, which can cause gaps in the film and grooves to form. In the event of changing conditions and external factors (contamination, uneven loading), it is no longer possible to accurately estimate the service life on the basis of the operating time. Either preventive maintenance can be carried out or the systems are only serviced in the event of failure. Alternatively, the condition of the wear components can be monitored.

A current collector of a busbar system has a plurality of conductors, typically copper strips, in an insulated casing. The current collector rails are located inside the casing, connected to electrical cables via an opening on the underside of the casing. The lower opening is usually closed with a neoprene strip to keep out foreign bodies and vapors. The current collector is guided by the busbars and need only be pulled with a pull arm. A contact block is that component of the current collector which conducts the electrical current between the stationary busbar and the moving current collector. The contact block has a carbon brush which typically has one or more carbon blocks and is equipped with one or more resistors or terminals.

Usually there is time-based maintenance or 'preventive maintenance' or an approach involving reactive maintenance or run to failure RTF. However, in addition to the system downtime, this often causes further damage to the conveying system as a damaged current collector puts more stress on the busbar than an intact current collector. If, for example, a sliding strip break occurs during travel, the overhead line can be torn down by the upward pushing action of the current collector support structure.

Condition monitoring technology based on a built-in wire exists for individual carbon blocks. The wire is insulated from the surrounding material of the carbon block and acts as a switch: after a certain amount of wear, the wire is frayed, indicating critical wear. However, such carbon blocks with built-in wires are more expensive than conventional carbon blocks and require additional hardware such as PLC input. Therefore, carbon brushes are usually used without condition monitoring and consequently without corresponding hardware.

Thermal cameras or manual visual inspection are also used for condition monitoring in order to determine the wear condition of the carbon brushes, both methods requiring personnel to monitor the conveying system during operation or during the mostly nocturnal rest periods. A visual inspection is often difficult to perform on account of carbon brushes and busbars being difficult to reach and see. Moreover, the sheer number of carbon brushes to be inspected leads to considerable expense. In addition, the reliability of the inspection is dependent on the experience of the inspection personnel and is thus highly subjective.

There are no automatic and continuous condition monitoring systems which simultaneously monitor the condition of the busbars and the current collector.

SUMMARY OF THE INVENTION

It is therefore the object of the present invention to detect wear during the operation of a conveying system which solves the problems described above. This object is achieved by the solutions described in the independent claims.

The solution according to the invention provides a system for detecting wear of a conveying system, in particular of an airport baggage conveying system, which comprises a sliding contact having a current collector and a current-carrying conductor, wherein the current collector is mounted on a vehicle and the vehicle is supplied with energy from the current-carrying conductor via the current collector. The system also comprises a vibration sensor mounted on the current collector and a background system. Vibrations produced during a driving motion of the vehicle, as the vehicle travels along the current-carrying conductor with the current collector being pressed against the current-carrying conductor, are registered by the vibration sensor and wirelessly transmitted to the background system. The background system is designed to analyze data transmitted to the background system, in particular the registered vibrations, and to signal the wear of the conveying system, in particular of the current collector and/or the current-carrying conductor, on the basis of this analysis.

In this way, critical wear of the current collector and/or the current-carrying conductor is signaled. Not only the vibrations, but also other data can be subjected to an analysis, so that other errors and not just wear can also be detected for the system. An impending failure is thus predicted. Maintenance of the conveying system can then be planned and, in addition, only carried out if it is actually necessary, without a failure having already occurred.

Current collectors and current-carrying conductors of a sliding contact have materials of varying hardness in the contact area, the material of the current collector preferably being a softer material than the material of the current-carrying conductor.

The solution according to the invention can be further improved by various embodiments which are each advantageous per se and, unless stated otherwise, can be combined with one another as desired. These embodiments and the advantages associated therewith are discussed hereinafter.

In order to make the registered vibrations and data spatially locatable, the system can also comprise a locating means for transmitting the position of the vibration sensor on the current collector side to the background system. The locating means can be arranged on the current collector side (location detection by means of triangulation, GPS, etc.) and/or fixed (camera, or the like).

According to one embodiment, the system can also comprise at least one further stationary vibration sensor which can be attached to the current-carrying conductor and is designed to register vibrations produced by the passing current collector and to wirelessly transmit said vibrations to the background system.

According to a further embodiment, the current-carrying conductor can be a busbar and/or the current collector can be a carbon brush. A busbar can be composed of a plurality of busbar sections and thus have joints, with irregularities in the joints being detectable by a vibration sensor.

According to a further embodiment, the system can also comprise a gateway for transmitting recorded data from the vibration sensors to the background system. For this purpose, the gateway can be installed at a fixed location along the current-carrying conductor and set a zero time each time a chassis having a vibration sensor passes over.

In order to obtain a more comprehensive overview of the condition of the conveying system, the vibration sensors can be designed to transmit status data of the vibration sensor to the background system in addition to the registered vibrations. Thus, the status data of each vibration sensor can contain a residual battery capacity and its temperature and other status data relevant to the respective conveying system. If the battery capacity falls below a specified level or a certain temperature is exceeded, the system can be designed to send a message.

According to a further embodiment, the current collector can have a spring which is designed to press the current collector against the current-carrying conductor. In this typical embodiment of a current collector, changes in the vibration pattern can be detected particularly well in the event of wear.

With regard to a method, the above-mentioned object is achieved by a method for detecting wear during the operation of a conveying system, in particular of an airport baggage conveying system, which comprises a sliding contact having a current collector and a current-carrying conductor, wherein the current collector can be mounted on a vehicle and the vehicle can be supplied with energy via the current collector. The method comprises the method steps:
a) Movement of the current collector along the current-carrying conductor, causing the current collector to vibrate.

b) Registration of the vibrations by a vibration sensor attached to the current collector on the current collector side.

c) Wireless transmission of the registered vibrations by the vibration sensor on the current collector side together with a timestamp and an identity of the vibration sensor to a background system.

d) In the background system, data transmitted to the background system, in particular the registered vibrations, are subjected to an analysis and, in the event of deviations, detected and signaled as wear of the conveying system, in particular of the current collector and/or of the current-carrying conductor.

According to a further embodiment, the method can also comprise the method steps:

e) Registration of the vibrations produced by the passing current collector on the current-carrying conductor by a further stationary vibration sensor.

f) Wireless transmission of the vibrations registered by the stationary vibration sensor together with an identity of the stationary vibration sensor to the background system.

g) Performance of the method step d) above for the data transmitted in method step f).

The vibration sensors can also transmit further status data of the vibration sensor. The result of the analysis can be signaled by a message.

According to a further embodiment, the transmission of the data from the vibration sensor to the background system can take place via a gateway, the gateway being installed at a fixed location along the current-carrying conductor. For a simple analysis, a zero time can be set each time a chassis having a vibration sensor passes over.

According to a further embodiment, the deviations can be detected by means of a statistical comparison with preceding registrations or by means of a comparison with a fixed variable.

According to a further embodiment, status data of each vibration sensor can be transmitted to the background system in addition to the registered vibrations.

According to a further embodiment, a position of the vibration sensor on the current collector side can be transmitted to the background system.

According to a further embodiment, the current collector can have a spring which is designed to press the current collector against the current-carrying conductor, so that the current collector is pressed against the current-carrying conductor during a driving motion along the current-carrying conductor, thus ensuring constant contact.

According to a further embodiment, the current-carrying conductor can be a busbar and/or the current collector can be a carbon brush.

According to one embodiment, the system according to the invention comprises all means for carrying out the method according to the invention.

Embodiments of the invention are explained in more detail hereinafter with reference to the figures, for example.

BRIEF DESCRIPTION OF THE FIGURES

FIG. 4 illustrates the different wear of two contact blocks having springs.

DETAILED DESCRIPTION OF THE INVENTION

Figure 1:
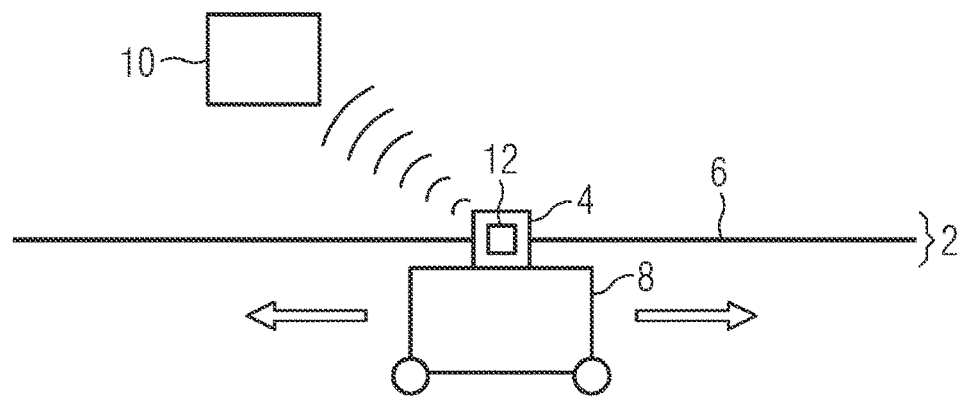
FIG. 1 schematically shows the system according to the invention.

FIG. 1 schematically shows the system according to the invention for detecting wear in a reduced embodiment. The sliding contact comprises a current-carrying conductor 6 and a current collector 4, which is attached to a vehicle 8. The vehicle 8 is supplied with energy from the current-carrying conductor 6 via the current collector 4. The current-carrying conductor 6 can be arranged below, next to and/or above the vehicle 8. A vibration sensor 12 is attached to the current collector 4 and thus to the vehicle 8 and the vehicle 8 can be moved at least along the current-carrying conductor 6. The system also comprises a background system 10. The vehicle 8, together with the vibration sensor 12 on the current collector side, travels along the current-carrying conductor 6, the current collector 4 being pressed against the current-carrying conductor 6. The vibrations produced as the current collector 4 slides in contact with the current-carrying conductor 6 during the driving motion of the vehicle 8 are registered by the vibration sensor 12 on the current collector side and wirelessly transmitted to the background system 10. The background system 10 analyzes the registered vibrations and any further data recorded by the vibration sensor 12 and/or further sensors, analyzes these and sends a message in the event of an abnormal analysis. If the vibration sensor 12 on the current collector side also comprises a locating means for transmitting the position of the vibration sensor 12 on the current collector side to the background system 10, the location of the fault can be analyzed with particular ease.

The further data transmitted by the vibration sensor 12 is dependent on the requirements of the respective conveying system. It is often expedient to record and transmit the temperature and residual battery capacity of the vibration sensor 12 at regular intervals or continuously.

The vibration pattern depends not only on the condition of the current collector 4, but also on the condition of the current-carrying conductor 6 and the conveying system. However, the condition of the current collector 4 and the current-carrying conductor 6 have the greatest influence on the vibration pattern. The vibration pattern measured by a new sliding contact without alignment errors or other problems is relatively consistent along the entire current-carrying conductor 6. A change in the vibration pattern at the location of this fault is perceived after some time due to wear or if another fault occurs (e.g. a burned-out busbar, a misaligned switch, or an incorrectly aligned connection between two busbar sections, etc.).

The busbar system itself may be several hundred meters long, constructed with the aid of connected busbar sections. The joints may be misaligned, and sections may be eroded or marked by burns, all of which may result in increased carbon brush wear.

There is a relationship between the force exerted by the spring 16 on the carbon brush 18 and the vibration pattern. As the wear increases, the force of the spring 16' on the carbon brush 18' is reduced. This can be seen in the vibration pattern.

FIG. 4 shows differences in the vibration pattern of a new current collector 4 with a new, non-worn carbon block of a carbon brush 18 and a tensioned spring 16 (on the left) and a current collector 4' towards the end of its service life with a worn carbon block of a carbon brush 18' and a stretched spring 16' (on the right). As shown in FIG. 3, the spring 16 presses the current collector 4 against the current-carrying conductors 6 of the busbar 14, which in turn are supplied with current by a busbar connection 20, and thus ensures electrical contact during the driving motion of the vehicle 8. A typical arrangement of the vehicle 8 on its track 22 and current collector 4 together with the vibration sensor 12 on the current collector side and stationary vibration sensor 12' along a busbar 14 having a plurality of current-carrying conductors 6 is shown in FIG. 2.

The contact block is the part of a current collector 4 which conducts current between the stationary busbar 14 or the current-carrying conductors 6 and the moving current collector 4. The contact block comprises a carbon brush which typically has one or more individual carbon blocks with one or more connections (shunts, terminals).

During a movement of the current collector 4, the vibrations are continuously measured by the vibration sensor 12. The vibration pattern of a new carbon brush (FIG. 4 on the left) and a carbon brush approaching the end of its life (FIG. 4 on the right) can be compared with one another in an analysis. The difference is used to predict the end of life of the carbon brush of the current collector 4.

Figure 2:
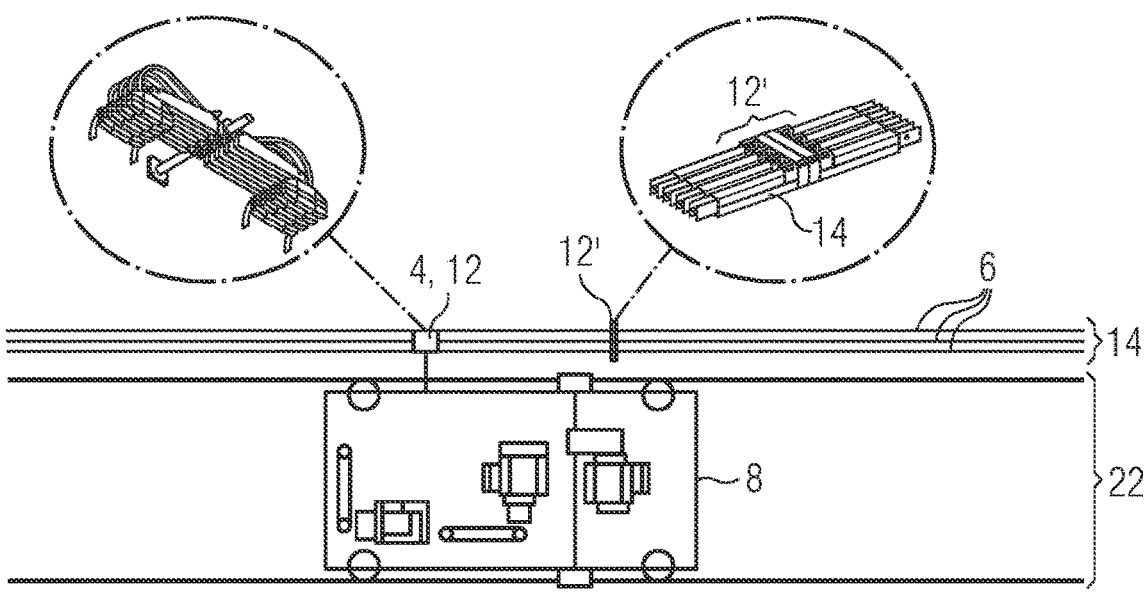
FIG. 2 shows stationary and current collector-side vibration sensors on a vehicle and the busbars.
Figure 3:
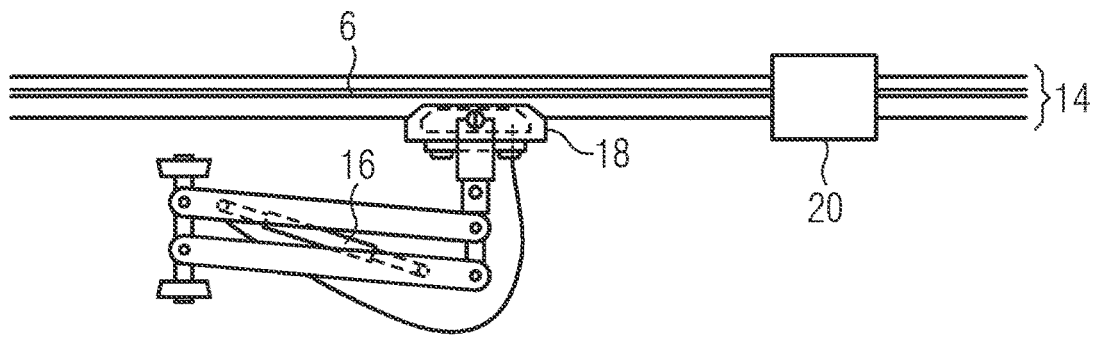
FIG. 3 shows a sliding contact of a busbar system together with the contact block.

In order to obtain an even more comprehensive image of the overall condition, a stationary vibration sensor 12' can also be installed on the busbar 14, as shown in FIG. 2. Likewise, FIG. 2 shows in detail how the vibration sensor 12 on the current collector side is arranged on the current collector 4 in order to individually detect vibrations from all the carbon blocks of the current collector 4 and from all the conductors of the busbar 14. The recorded vibrations of the vibration sensors 12, 12' are transmitted wirelessly to the background system 10 and subjected to an analysis.

The vibration sensor 12 on the current collector side, mounted on the current collector 4, continuously measures the vibration pattern produced during travel. This vibration pattern is mapped back to a fixed position along the busbar with a trigger/gateway sensor to determine the position of the current collector 4 during each measurement interval. This trigger/gateway sensor acts as a locating means. The locating means transmits the position of the vibration sensor 12 on the current collector side, and thus of the current collector 4, to the background system 10.

As a traveling sensor, the vibration sensor 12 on the current collector side can detect problems and the condition of the current collector 4 and of the current-carrying conductor 6, wear being of particular relevance. In order to detect problems only or additionally on the current-carrying conductor 6, but also on the normal track 22 of the vehicle 8, a stationary vibration sensor 12 is used for supplementary analysis.

According to one embodiment, the system according to the invention is monitored and encompassed by a SCADA system and is thus integrated into the SCADA system.

LIST OF REFERENCE CHARACTERS

2 Sliding contact
4 Current collector
6 Current-carrying conductor
8 Vehicle
10 Background system
12 Vibration sensor
14 Busbar
16 Spring
18 Carbon brush
20 Busbar connection
22 Track

The invention claimed is:

1. A system for detecting wear of an airport baggage conveying system, the system comprising:
    a sliding contact having a current collector and a current-carrying conductor, said current collector mounted on a vehicle configured to transport baggage to or from a baggage sorter or early baggage storage, the vehicle being supplied with energy from the current-carrying conductor via said current collector;
    a background system;
    a vibration sensor mounted on said current collector, configured to register vibrations when the current collector slides in contact with the current-carrying conductor during a driving motion of the vehicle along said current-carrying conductor and to wirelessly transmit the registered vibrations to said background system;
    said background system configured to analyze data transmitted to said background system and to signal wear of the airport baggage conveying system on a basis of the analysis; and
    wherein said registered vibrations form a vibration pattern and said background system is configured to analyze said vibration pattern to detect wear in the airport baggage conveying system.

2. The system according to claim 1, further comprising a locating means for transmitting a position of said vibration sensor on the current collector side to said background system.

3. The system according to claim 1, further comprising at least one further stationary vibration sensor attached to said current-carrying conductor and configured to register vibrations produced by said current collector passing thereby and to wirelessly transmit the vibrations to said background system.

4. The system according to claim 1, wherein said current-carrying conductor is a busbar and/or said current collector is a carbon brush.

5. The system according to claim 3, further comprising a gateway for transmitting recorded data from said vibration sensor and said at least one further stationary vibration sensor to said background system.

6. The system according to claim 3, wherein said vibration sensor and said at least one further stationary vibration sensor are configured to transmit status data of said vibration sensor and said at least one further stationary vibration sensor to said background system in addition to the registered vibrations.

7. The system according to claim 1, wherein said current collector has a spring configured to press said current collector against said current-carrying conductor.

8. The system according to claim 1, wherein:
    the data includes registered vibrations of said current collector and/or of said current-carrying conductor.

9. A system for detecting wear of an airport baggage conveying system, the system comprising:
    a sliding contact having a current collector and a current-carrying conductor, said current collector mounted on a vehicle configured to transport baggage to or from a baggage sorter or early baggage storage, the vehicle being supplied with energy from the current-carrying conductor via said current collector;
    a background system;
    a vibration sensor mounted on said current collector, configured to register vibrations when the current collector slides in contact with the current-carrying conductor during a driving motion of the vehicle along said current-carrying conductor and to wirelessly transmit the registered vibrations to said background system;
    said background system configured to analyze data transmitted to said background system and to signal wear of the airport baggage conveying system on a basis of the analysis;
    a locating means for transmitting a position of said vibration sensor on the current collector side to said background system; and
    wherein said vibration sensor is configured to continuously measure a vibration pattern produced during travel of the vehicle and said vibration pattern is mapped back to a fixed position along the current-carrying conductor.

10. The system according to claim 9, wherein said background system is configured to analyze said vibration pattern to detect wear in the airport baggage conveying system.

11. A method for detecting wear during an operation of an airport baggage conveying system containing a sliding contact having a current collector and a current-carrying conductor, wherein the current collector is mounted on a vehicle configured to transport baggage to or from a baggage sorter or early baggage storage and the vehicle is supplied with energy from the current-carrying conductor via the current collector, the method comprising the steps of:
    a) moving the vehicle to transport baggage and move the current collector mounted on the vehicle along the current-carrying conductor;
    b) registering vibrations by a vibration sensor attached to the current collector on a current collector side;
    c) wirelessly transmitting registered vibrations from the vibration sensor on the current collector side together with a timestamp and an identity of the vibration sensor to a background system; and
    d) analyzing, via the background system, data transmitted to the background system and, in an event of deviations being detected, signaling wear of the airport baggage conveying system, wherein the vibrations registered by the vibration sensor form a vibration pattern and the background system analyzes the vibration pattern to detect wear in the airport baggage conveying system.

12. The method according to claim 11, which further comprises:
    e) registering the vibrations produced by a passing current collector on the current-carrying conductor by a further stationary vibration sensor;

f) wirelessly transmitting the vibrations registered by the further stationary vibration sensor together with an identity of the further stationary vibration sensor to the background system; and g) analyzing, via the background system, further data transmitted from the further stationary vibration sensor to the background system and, in an event of deviations being detected, signaling wear of the conveying system.

13. The method according to claim 11, which further comprises transmitting the data from the vibration sensor to the background system via a gateway, wherein the gateway is installed at a fixed location along the current-carrying conductor and a zero time is set each time a chassis having the vibration sensor passes over.

14. The method according to claim 11, which further comprises detecting the deviations by means of a statistical comparison with preceding registrations or by means of a comparison with a fixed variable.

15. The method according to claim 11, which further comprises transmitting status data of the vibration sensor to the background system in addition to the registered vibrations.

16. The method according to claim 11, which further comprises transmitting a position of the vibration sensor on the current collector side to the background system.

17. The method according to claim 11, which further comprises providing the current collector with a spring configured to press the current collector against the current-carrying conductor.

18. The method according to claim 11, wherein the current-carrying conductor is a busbar and/or the current collector is a carbon brush.

19. The method according to claim 11, wherein:
the data includes registered vibrations of said current collector and/or of said current-carrying conductor.

20. A method for detecting wear during an operation of an airport baggage conveying system containing a sliding contact having a current collector and a current-carrying conductor, wherein the current collector is mounted on a vehicle configured to transport baggage to or from a baggage sorter or early baggage storage and the vehicle is supplied with energy from the current-carrying conductor via the current collector, the method comprising the steps of:

a) moving the vehicle to transport baggage and move the current collector mounted on the vehicle along the current-carrying conductor;

b) registering vibrations by a vibration sensor attached to the current collector on a current collector side;

c) wirelessly transmitting registered vibrations from the vibration sensor on the current collector side together with a timestamp and an identity of the vibration sensor to a background system;

d) analyzing, via the background system, data transmitted to the background system and, in an event of deviations being detected, signaling wear of the airport baggage conveying system;

e) transmitting, with a locating means, a position of the vibration sensor on the current collector side to the background system; and f) continuously measuring, with the vibration sensor, a vibration pattern produced during travel of the vehicle and mapping the vibration pattern back to a fixed position along the current-carrying conductor.

* * * * *